United States Patent [19]

Faul

[11] Patent Number: 4,614,282
[45] Date of Patent: Sep. 30, 1986

[54] CONNECTING MEANS FOR COVER

[75] Inventor: Thomas L. Faul, Washago, Canada

[73] Assignee: Teckserve Ltd., Ontario, Canada

[21] Appl. No.: 761,430

[22] Filed: Jul. 31, 1985

[30] Foreign Application Priority Data

Jul. 25, 1985 [CA] Canada .................................. 487452

[51] Int. Cl.⁴ ............................................. B65D 39/00
[52] U.S. Cl. ..................................... 220/307; 220/326
[58] Field of Search ........................ 220/306, 307, 326

[56] References Cited

U.S. PATENT DOCUMENTS 3,394,838 11/1966 Larkin .................................. 220/326

Primary Examiner—George T. Hall
Attorney, Agent, or Firm—Riches, McKenzie & Herbert

[57] ABSTRACT

A connecting mechanism for connecting a one-piece, molded-plastic cover having an outer skirt extending downwardly from the periphery of the cover to a one-piece, molded plastic body having at least a partially-hollow interior portion. The connecting means comprises flexible leg-members extending downwardly from an interior region of the cover. Each leg-member has an opening in the lower, central portion thereof. The body has dog-members which correspond to the corresponding leg-members in the cover. When the cover is connected to the body, the dog-members become engaged in the opening of the corresponding leg-member. The invention has particular application for connecting steering-wheel hub-caps to steering-wheel hubs.

19 Claims, 8 Drawing Figures

CONNECTING MEANS FOR COVER

BACKGROUND OF THE INVENTION

This invention relates to a connecting mechanism for connecting a one-piece, molded-plastic cover having an outer skirt extending downwardly from the periphery of the cover to a one-piece, molded plastic body having at least a partially-hollow interior portion. In particular, the invention relates to a connecting mechanism comprising flexible leg-members extending downwardly from an interior region of the cover which receive dog-members connected to the base when the cover is connected to the body.

In the past, covers have been connected to partially-hollow bodies by means of flexible leg-members. However, either the leg-members of those prior art connecting mechanisms extended downwardly from the peripheral region of the cover or, if the leg-members extended downwardly from an interior region, there was no outer skirt extending downwardly from the peripheral region of the cover.

If it was desired to manufacture a cover having an outer skirt extending downwardly from the peripheral region of the cover and having leg-members extending downwardly from an interior region of the cover, many difficulties were encountered during the manufacturing process. These difficulties arose during the molding of the cover.

SUMMARY OF THE INVENTION

Accordingly, it is an object of this invention to at least partially overcome the disadvantages of the prior art and provide a connecting mechanism for connecting a one-piece, molded-plastic cover having an outer skirt extending downwardly from a peripheral region of the cover to a one-piece, molded-plastic body having at least a partially-hollow interior portion in which the connecting leg-members extend downwardly from an interior region of the cover.

Accordingly, in one of its broad aspects, this invention resides in providing a connecting mechanism for connecting a one-piece, molded-plastic cover having an outer skirt extending downwardly from a peripheral region of the cover to a one-piece, molded-plastic body having at least a partially-hollow interior, comprising: (a) two flexible leg-members, each extending downwardly from an interior region of the cover and each having an opening in the lower, central portion thereof; and (b) two dog-members, each corresponding to a corresponding leg-member and shaped, sized and positioned within the body so as to be insertable within the opening in the corresponding leg-member when the cover is connected to the body; wherein, when connected, the portion of each leg-member below its respective opening is accessible from the exterior of the body for applying sufficient flexure to the leg-member in order to release the leg-member from the corresponding dog-member.

Further aspects of the invention will become apparent from the following description of the invention and the preferred embodiments thereof.

BRIEF DESCRIPTION OF THE DRAWINGS

In the drawings which illustrate the invention and embodiments thereof.

DESCRIPTION OF THE INVENTION AND PREFERRED EMBODIMENTS THEREOF

Figure 1:
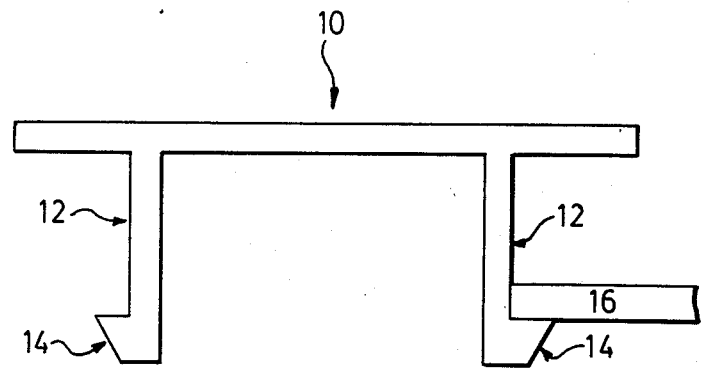
FIG. 1 is a schematic view of a prior art cover.

With reference to FIG. 1, a typical prior art cover 10 is shown. In such a cover 10, there are leg-members 12 extending downwardly from an interior position on the cover 10. Each leg-member 12 has a tooth 14 formed at the lower portion thereof which would engage with a shoulder 16 (partially shown) on the body (not shown) which is to be connected to the cover 10.

Figure 2:
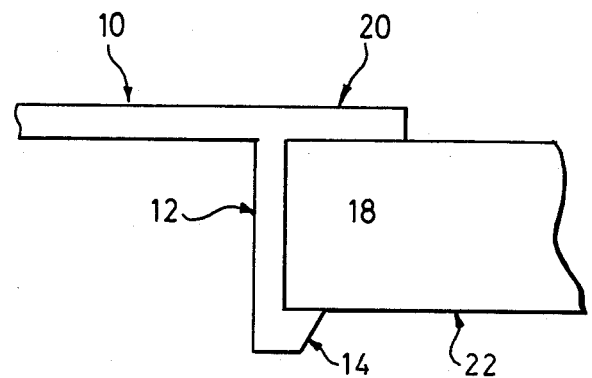
FIG. 2 is a schematic view of a prior art cover.

In the manufacturing or molding of the cover 10, an undercut 18 as shown in FIG. 2 would be present between the tooth 14 and the portion of the cover indicated as 20. Thus, in the past, it was necessary to use a solid core 22 that could be inserted during the molding process and then removed when the part had hardened.

Figure 3:
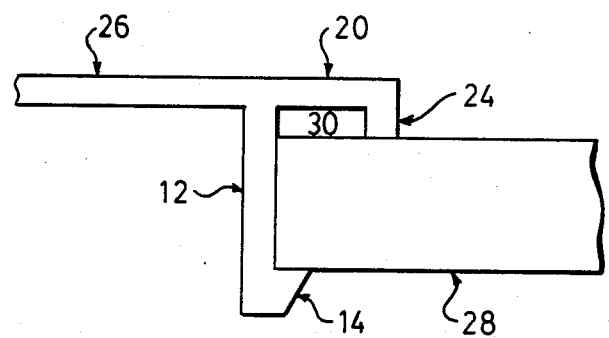
FIG. 3 is a schematic view of a prior art cover.

However, when the cover has a cover 26 as shown in FIG. 3 which includes a skirt 24 extending downwardly from the peripheral region of the cover 26, a solid core 28 that is smaller than the solid core 18 in FIG. 2 has to be used because of the obstruction caused by skirt 24. Thus, an undercut 30 results. Therefore, such a cover 26 as shown in FIG. 3 could not previously be molded, without creating a heavy wall section, subject to skrinkage and surface deformation.

Figure 4:
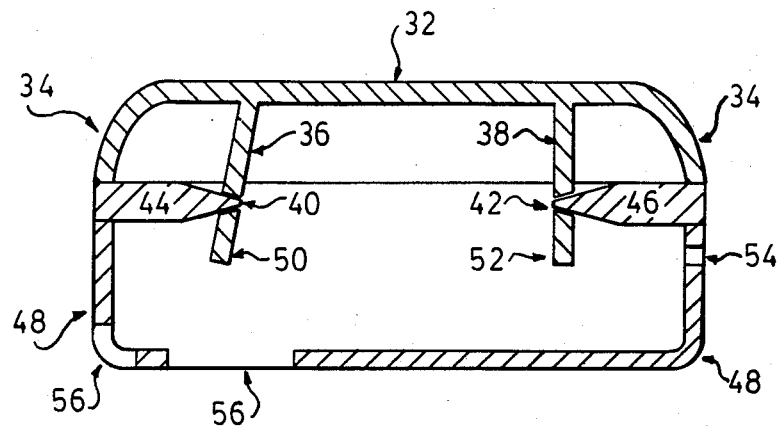
FIG. 4 is a schematic view of an embodiment of this invention.

In order to overcome this problem with the prior art, the inventor of the present invention has provided a cover 32 as shown in FIG. 4.

Cover 32 has an outer skirt 34 and two flexible leg-members 36 and 38 extending downwardly from interior regions of the cover 32. Also, each leg-member 36 and 38 has a respective opening 40, 42, preferably, in the lower, central region of the leg-members 36, 38.

Insertable into each opening 40, 42 is a corresponding dog-member 44, 46 which is molded into the body 48 onto which the cover 32 is connected. Each dog-member 44, 46 has a size, shape and position within the body 48 so as to allow each dog-member 44, 46 to be insertable within the opening 40, 42 of the corresponding leg-member 36 and 38.

The body 48 is any sort of body that has a partially-hollow interior so as to allow for movement of the respective leg-members 36, 38 in the region of the dog-members 44, 46 for engagement and disengagement with the dog-members 44, 46.

In order to connect the cover 32 to the body 48, the cover 42 is placed above the body 48 and a downward force is applied so as to force the respective leg-members 36, 38 against the corresponding dog-members 44, 46 thereby eventually causing a flexure in the leg-members 36, 38 until the dog-members 44, 46 are aligned with the openings 44, 42 and then inserted or engaged into the openings 40, 42.

In order to remove the cover 32, a force must be applied so as to create a flexure in the respective leg-members 36, 38 away from the corresponding dog-members 44, 46. When the leg-members 36, 38 are clear of the corresponding dog-members 44, 46, a small upward force on the leg-members 36, 38 will free the leg-members 36, 38 from the dog-members 44, 46 and the cover 32 can be removed.

The flexure of the leg-members 36, 38 can be obtained from any suitable means such as a finger or thumb or a tool such as a screwdriver. However, in order to ensure that such flexure can be applied, the portions 50, 52 of the respective leg-members 36, 38 below the respective openings 40, 42 must be accessable from the exterior of the body 48.

Access to the portions 50, 52 can be provided by an access opening 54 in the side of the body 48 (shown in the right side of FIG. 4) or an access opening 56 in the bottom of the body 48 (shown on the left side of FIG. 4). It is possible that the portions 50, 52 could extend past the bottom of the body 48 or remain within the body 48 as shown.

In one embodiment, the dog-members 44, 46 can be positioned on, or form a part of, the bottom of the body 48 such that the portions 50, 52 must extend past the bottom of the body 48.

Figure 5:
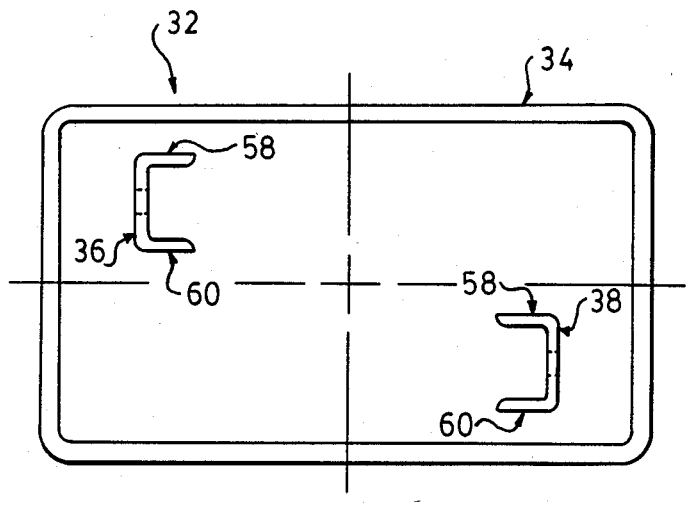
FIG. 5 is a bottom view of a cover of this invention.

In a preferred embodiment of the invention, the leg-members 36, 38 are flat, substantially rectangular bodies. In order to improve the strength of the leg-members 36, 38 but still maintain the flexibility of these members, side members 58, 60 can be placed on the edges of the leg-members 36, 38 and molded into the cover 32 as shown in FIG. 5. Preferably, the side members 58, 60 would have a greater width at the end closer to the cover 32 and a smaller width towards the end portions 50, 52 of the leg-members 36, 38.

Preferably, the leg-members 36, 38 extend downwardly and either outwardly or inwardly. However, the leg-members 36, 38 could extend substantially vertically.

Preferably, the leg-members 36, 38 extend outwardly and in the most preferred embodiment, the leg-members 36, 38 extend outwardly at a slope of about 10° off the vertical.

Even when the leg-members 36, 38 are slanted either outwardly or inwardly it is acceptable to have the dog-members 44, 46 approach the leg-members 36, 38 from either the inward or the outward direction. Preferably, the dog-members 44, 46 should approach the leg-members 36, 38 from the outward direction as shown in FIG. 4 in order that the dog-members 44, 46 do not encroach on the space within the interior of the body 48.

The positions of the leg-members 36, 38 on the cover 32 are not critical. However, for ease in connecting the cover 32 to the body 48, the leg-members 36, 38 should be symmetrically positioned so that either leg-member 36 or 38 will correspond to either of dog-member 44 or 46 depending on the orientation of the cover 32. FIG. 5 shows the leg-members 36, 38 symmetrically positioned on a rectangular cover 32. When the leg-members 36, 38 are symmetrically positioned, the person connecting the cover 32 to the body 48 will not have to check to see which leg-member 36, 38 fits which dog-member 44, 46.

It is not necessary that the two leg-members 36, 38 be on a center line or on a diameter of the cover 32. It is possible that the leg-members 36, 38 be off set from the center lines of the cover 32. For example, the leg-members 36, 38 are off from the center lines of the rectangular shaped cover 32 in FIG. 5.

The openings 40, 42 in leg-members 36, 38 preferably extend all the way through the leg-members 36, 38.

Preferably, the shape of the openings 40, 42 is substantially square or rectangular.

Preferably, the interior walls of the openings 40, 42 are angled (as shown in FIG. 4) so that the dog-members 46, 48 are more easily receivable within the openings 40, 42. Also, having the interior walls angled enables the cover 32 to be more easily molded.

Preferably, the dog-members 44, 46 are angled in order that they are more easily received into the openings 40, 42. The angle can be on all faces of the dog-members 44, 46 or only on the top and bottom faces.

The position and orientation of the dog-members 44, 46 in relation to the coresponding leg-members 36, 38 is a matter of choice but it will be apparent to the skilled person that there are limitations. For instance, the dog-members 44, 46 cannot extend too far past the leg-members 36, 38 otherwise the leg-members 36, 38 will not flex enough in order to clear the dog-members 44, 46 during engagement and disengagement.

Preferably, the dog-members 44, 46 as positioned marginally forward of the non-flexed position of the leg-members 36, 38 such that when the leg-members 36, 38 are engaged with the dog-members 44, 46 the leg-members 36, 38 remain slightly flexed in order to provide a more secure fit.

Similarly, the dog-members 44, 46 may be positioned marginally downwardly from the normal resting position of the corresponding openings 40, 42 such that the top cover 32 must be flexed downwardly during connection in order that the dog-members 44, 46 can be inserted into the openings 40, 42. When the dog-members 44, 46 are engaged and the applied downward pressure on the cover 32 is removed, the cover 32 will tend to have a more secure fit.

Preferably, the portions 50, 52 of the leg-members 36, 38 are accessable from the bottom of the body 48 through access opening 56 (left side of FIG. 4).

Figure 6:
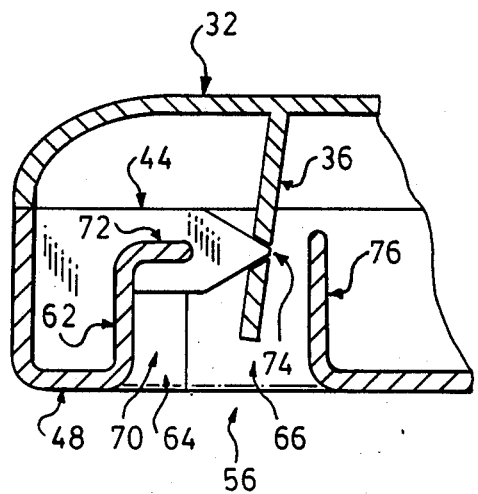
FIG. 6 is a schematic cross-sectional view of an embodiment of the invention taken along line A—A of FIG. 7.

A preferred embodiment of the invention includes a recess wall 62 as part of the access opening 56. The recess wall 62 can provide support for the corresponding dog-member 44, 46 (FIG. 6).

In another preferred embodiment, opening 56 comprises a recessed portion 64 and an open portion 66. The open portion 10 can be part of the interior portion of the body 48 or it can be separated by a dividing wall 76.

Figure 7:
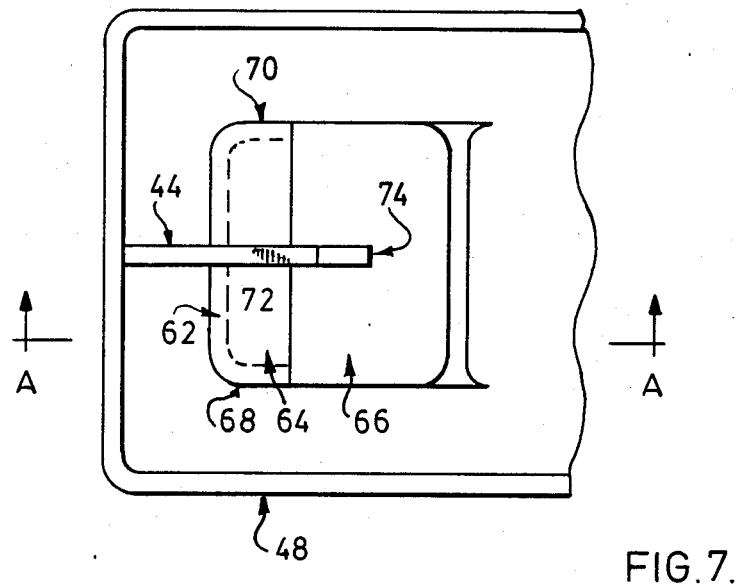
FIG. 7 is a schematic view of an embodiment of the invention.

Recess portion 64 is formed by recess wall 62 together with recess walls 68, 70 and recess ceiling 72. Recess ceiling 72 can provide support for the dog-members 44, 46 (FIG. 7).

In order to manufacture the connecting means of this invention, it is preferred to incorporate the connecting means into the cover 32 and the body 48 so that each of the cover 32 and the body 48 are one-piece, molded-plastic products.

It is possible to mold the body 48 of the invention without any undercuts if the break-line of the two parts of the mold occurs at the tips 74 of the dog-members 44, 46.

In order to overcome the problems of molding a cover as discussed respecting the prior art, the mold 80 for the cover 32 comprises a cover side 82 of the mold 80 and a core side 84 of the mold 80. The two parts 82, 84 of the mold 80 are made from a suitable material preferably a suitable steel.

Figure 8:
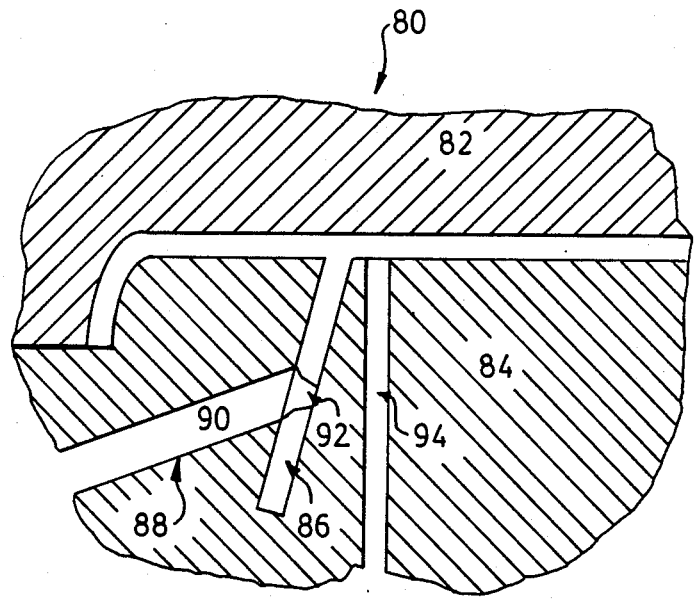
FIG. 8 is a schematic view of a mold for manufacturing the cover invention.

The core side 84 of the mold 80 includes two hole portions 86 (only one shown in FIG. 8) from which the leg-members 36, 38 are formed. In order to overcome the problems of the prior art, the invention uses tunnels 88 in which a movable cores 90 are slidable. The end 92 of the core 90 slides into a hole 86 during the molding process. The end 92 of the core 90 forms the openings 40, 42 in the leg-members 36, 38. Preferably, the core end 92 kisses or just touches the inner face of the hole 86 in the core side 84 of the mold 80. After the plastic has hardened in the mold 80, the core 90 is withdrawn from the hole 86 through tunnel 88 and knockout pins 94 are used to remove the finished cover 32.

The connecting means of this invention has particular application for connecting steering-wheel hubcaps to steering-wheel hubs. For this application, it is preferred, for aesthetic reasons, that the engagement of the leg-members 36, 38 with the corresponding dog-members 44, 46 not be ordinarily visible. Thus, access openings 56 in the bottom of the body 48 (hub) are preferred.

Furthermore, in order to reduce the risk that the cover 32 (cap) will be inadvertently removed during operation of the vehicle, the portions 50, 52 of the leg-members 36, 38 should remain within the body 48 (hub).

In this embodiment, preferably the leg-members 36, 38 extend outwardly in order that the dog-members 44, 46 do not encroach on the space within the interior of the body 48 (hub).

Preferably, the body 48 (hub) is part of or integral with the steering-wheel itself comprising the hub, spokes and rim.

In a preferred embodiment of the invention all of or at least as many as possible of the various molded features of the cover 32 have approximately the same thickness in order to aid in the molding process. Similarly, all of or as many as possible of the various molded features of the body 48 have approximately the same thickness in order to aid in the molding process.

Although the disclosure describes and illustrates preferred embodiments of the invention, it is to be understood that the invention is not necessarily restricted to these embodiments.

What I claim is:

1. A connecting mechanism for connecting a one-piece, molded-plastic cover having an outer skirt extending downwardly from a peripheral region of the cover to a one-piece, molded-plastic body having at least a partially-hollow interior, comprising:
   (a) two flexible leg-members, each extending downwardly from an interior region of the cover and each having an opening in the lower, central portion thereof; and
   (b) two dog-members, each corresponding to a corresponding leg-member and shaped, sized and positioned within the body so as to be insertable within the opening in the corresponding leg-member when the cover is connected to the body;
wherein, when connected, the portion of each leg-member below its respective opening is accessible from the exterior of the body for applying sufficient flexure to the leg-member in order to release the leg-member from the corresponding dog-member.

2. A mechanism as defined in claim 1 wherein the leg-members are each flat and substantially-rectangular.

3. A mechanism as defined in claim 1 wherein the leg-members are symmetrically positioned and of similar size and shape so that either dog-member is insertable within either leg-member.

4. A mechanism as defined in claim 3 wherein leg-members are offset from the centre lines of the cover.

5. A mechanism as defined in claim 1 wherein each leg-member extends downwardly and outwardly.

6. A mechanism as defined in claim 2 wherein each leg-member extends downwardly and outwardly.

7. A mechanism as defined in claim 1 wherein each leg-member extends downwardly and outwardly at slope of about 10° off the vertical.

8. A mechanism as defined in claim 1 wherein at least some of the interior walls of each opening in the leg-member are angled.

9. A mechanism as defined in claim 1 wherein each dog-member is angled so as to be more readily insertable within the opening of the corresponding leg-member.

10. A mechanism as defined in claim 6 wherein each dog-member is angled so as to be more readily insertable within the opening of the corresponding leg-member.

11. A mechanism as defined in claim 1 wherein each dog-member is positioned marginally forward of the nonflexed position of the corresponding leg-member.

12. A mechanism as defined in claim 1 wherein each dog-member is positioned marginally downward from the normal resting position of the opening of the corresponding leg-member.

13. A mechanism as defined in claim 1 wherein each dog-member is positioned on the bottom portion of the body.

14. A mechanism as defined in claim 1 wherein the portion of each leg-member below its respective opening is accessible through an opening in the bottom portion of the body.

15. A mechanism as defined in claim 10 wherein the portion of each leg-member below its respective opening is accessible through an opening in the bottom portion of the body.

16. A mechanism as defined in claim 1 wherein each opening in the bottom portion of the body includes a recessed portion formed by walls and a ceiling wherein the walls and ceiling support the dog-member corresponding to the opening.

17. A mechanism as defined in claim 15 wherein each opening in the bottom portion of the body includes a recessed portion formed by walls and a ceiling wherein the walls and ceiling support the dog-member corresponding to the opening.

18. A mechanism as defined in claim 1 wherein the cover is a steering-wheel hub-cup and the body is a steering-wheel hub.

19. A mechanism as defined in claim 17 wherein the cover is a steering-wheel hub-cap and the body is a steering-wheel hub.

* * * * *